Sept. 18, 1945.　　　　H. BUTHE　　　　2,385,059

HYDRO-MECHANICAL POWER TRANSMISSION

Filed May 6, 1944　　　　2 Sheets-Sheet 1

INVENTOR.
Henry Buthe
BY George D. Richards
ATTORNEY.

Sept. 18, 1945.  H. BUTHE  2,385,059
HYDRO-MECHANICAL POWER TRANSMISSION
Filed May 6, 1944  2 Sheets-Sheet 2
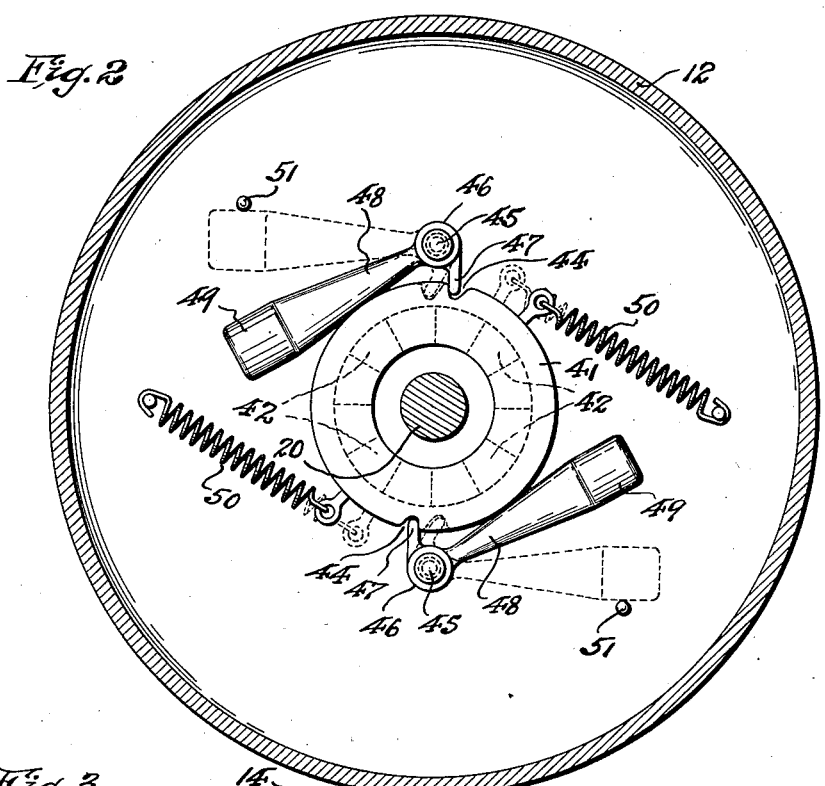
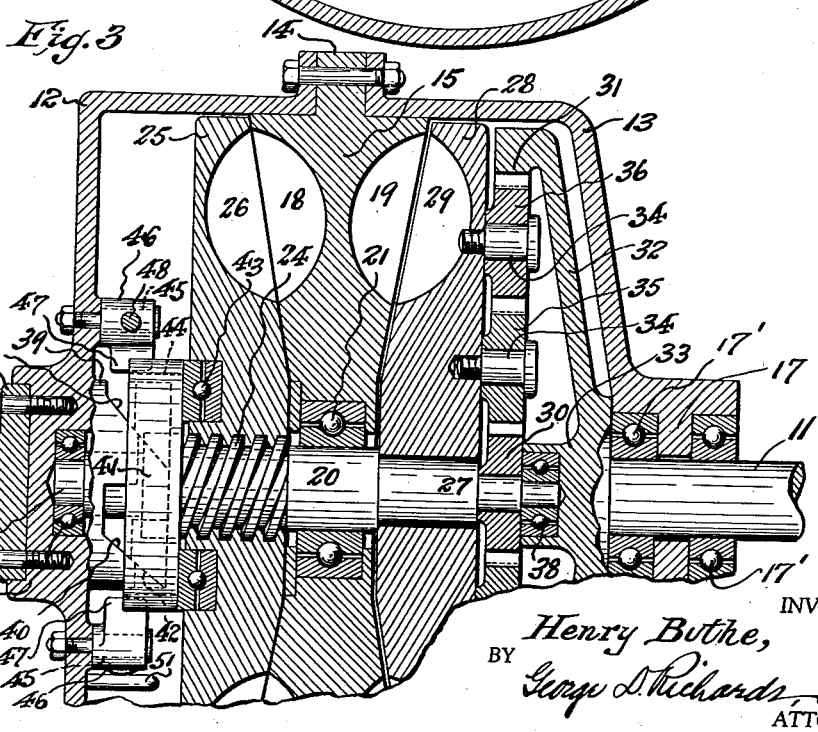
INVENTOR.
Henry Buthe,
BY George D. Richards
ATTORNEY.

Patented Sept. 18, 1945

UNITED STATES PATENT OFFICE 2,385,059

2,385,059

HYDROMECHANICAL POWER TRANSMISSION

Henry Buthe, Cliffside, N. J., assignor to Star Engineering Company, Newark, N. J., a firm composed of Hilmer Lagergren and Vincent Oehrlein, both of Union, N. J., and Henry Buthe, Cliffside, N. J.

Application May 6, 1944, Serial No. 534,415

9 Claims. (Cl. 74—189.5)

This invention relates to improvements in hydromechanical power transmission mechanism of the differential type.

The invention has for an object to provide a novel hydro-mechanical power transmission mechanism comprising a power driven compound turbine operating through a dual planetary gear train to transmit power to a driven shaft, whereby the power transmitted automatically adjusts itself to variations of load through automatic shift from low gear drive, effecting maximum application of power, to high gear drive, effecting maximum speed commensurate with the load, and vice versa.

The invention has for another object to provide a hydro-mechanical power transmission mechanism of the kind mentioned, wherein the turbine comprises a power driven impeller member provided with oppositely directed driving faces, a pair of independent rotor members respectively cooperative with the respective driving faces of said impeller member, one said rotor member carrying the planetary gears of a dual planetary gear train, the other said rotor member being arranged in driving relation to the sun gear of the planetary gear train, the ring gear of the planetary gear train being unitary with the driven shaft, and automatic means being provided for moving the last mentioned rotor member toward and from the impeller member, whereby to reduce drag upon the power shaft under idling conditions, as well as to permit power shaft acceleration substantially free of load under starting conditions and until a selected predetermined R. P. M. thereof is attained before subjection thereof to full load; all of which is especially advantageous when the power source comprises an internal combustion engine.

Other objects of this invention, not at this time more particularly enumerated, will be understood from the following detailed description of the same.

An illustrative embodiment of this invention is shown in the accompanying drawings, in which—

Figure 1:
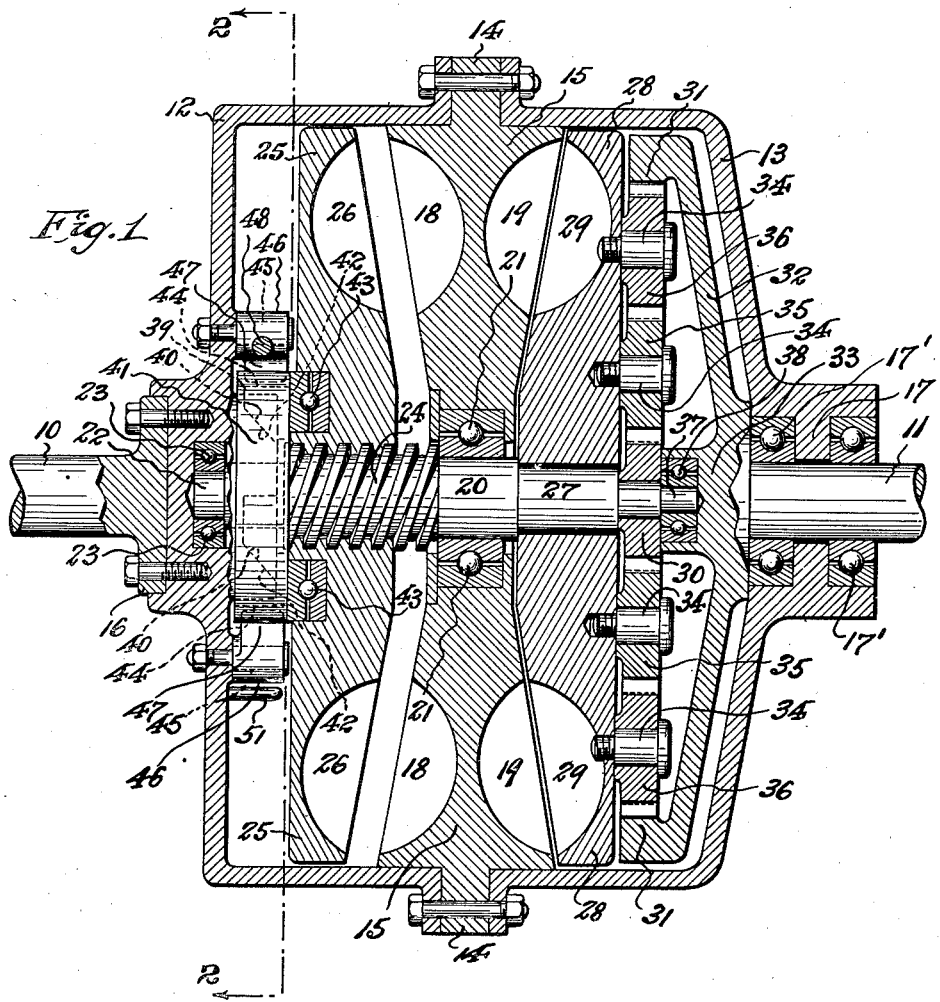
Figure 4:
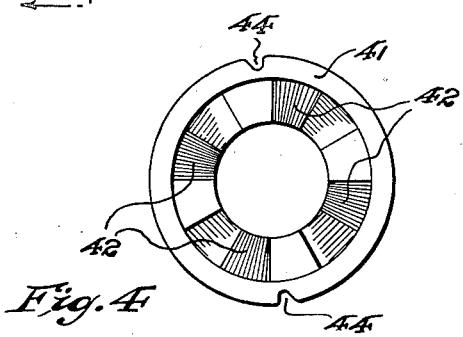

Fig. 1 is a central longitudinal sectional view of a hydro-mechanical power transmission made according to this invention, with the sun gear driving rotor in initial retracted position to permit idling of the power shaft and predetermined acceleration of said shaft prior to subjection there to full load; Fig. 2 is a transverse sectional view, taken on line 2—2 in Fig. 1; Fig. 3 is a view similar to that of Fig. 1, but showing the sun gear driving rotor advanced subject to full driving torque of the turbine impeller for power transmission to load; and Fig. 4 is a detail interior face view of the movable member of the cam means employed to control advance and retraction of the sun gear driving rotor.

Similar characters of reference are employed in the above described views, to indicate corresponding parts.

Referring to the drawings, the reference character 10 indicates a power shaft, which may be actuated by any suitable power source, such, e. g., as an internal combustion or other type of engine, electric motor, or the like.

The power shaft 10 drives a driven shaft 11, longitudinally aligned therewith, through a compound turbine and associated planetary gearing; said turbine being generally of the kind known to the art as the Fottinger type turbine.

The turbine comprises a casing formed by a pair of opposed shells 12 and 13. Affixed to and between said shells is the supporting flange 14 of the turbine impeller member 15, which extends into and around the interior of the casing, being thus arranged to revolve with said casing. The casing and turbine impeller member is power driven, and to this end the casing is axially aligned with and affixed to the power shaft 10 by suitable fastening or coupling means, as, e. g., by bolting a flanged end 16 of said power shaft to the casing shell 12. The casing shell 13 is provided with an axially disposed bearing portion 17, including anti-friction bearing means 17', through which the driven shaft 11 extends from its operative connected relation to the turbine mechanism.

The impeller member 15 is provided with oppositely directed driving faces; one such face, which is presented toward the interior of the casing shell 12, being provided with a radially vaned annular recess 18, and the other such face, which is presented toward the interior of the casing shell 13, being provided with a like radially vaned annular recess 19.

Mounted within the turbine casing, intermediate and in alignment with the power and driven shafts 10 and 11, is a turbine shaft 20, about which the impeller member 15 revolves; said turbine shaft being in part supported by a suitable anti-friction bearing means 21 which is mounted in the internal peripheral portion of said impeller member 15, so as to be interposed between the same and said turbine shaft. The forward end of said turbine shaft 20 is provided with a journal portion 22 which is rotatably supported in a suitable antifritcion bearing means 23 which is mounted in the end wall of said casing shell 12. The forward portion of said turbine shaft 20 is formed to provide a spirally splined or threaded portion 24 of left-hand pitch.

Keyed to said turbine shaft 20 by the splined portion 24 so as to be capable of moving axially back and forth thereon while nevertheless adapted to rotate therewith is a forward turbine rotor member 25, which is housed within the interior of the casing shell 12 and which is opposed to the forward driving face of the impeller member 15. The operative face of said rotor member 25 is provided with a radially vaned annular recess 26 which is operatively opposed to said radially vaned annular recess 18 of the impeller member 15.

Mounted within the interior of the housing shell 13 so as to rotate freely about the rearward portion 27 of said turbine shaft 20, is a rearward turbine rotor member 28. The operative face of said rotor member 28 is operatively opposed to the rearward driving face of the impeller member 15, and is provided with a radially vaned annular recess 29 which cooperates with said radially vaned annular recess 19 of the impeller member 15. Said rotor member 28 is incapable of axial movement relative to the impeller member 15, and is positioned with respect to the latter in a predetermined limited spaced relation thereto, to allow for limited slip under the initial driving impulsion of said impeller member 15.

Affixed to the turbine shaft 20, beyond the rotor member 28 and so as to turn with said turbine shaft 20, is the sun gear 30 of the dual planetary gearing of the transmission mechanism. The ring gear 31 of the planetary gear train is connected with the periphery of a carrier drum or disk 32, the hub 33 of which is affixed to and rotates with the driven shaft 11. The rotor member 28 serves as a planetary pinion carrier, and to this end dual planetary pinions are rotatably mounted on journal studs 34 which are affixed to said rotor member 28 so as to project from the outer face thereof. Said dual planetary pinions comprise intermeshing inner and outer pinions 35 and 36, the inner pinions 35 meshing with the sun gear 30, and the outer pinions 36 meshing with the ring gear 31.

The rearward end of said turbine shaft 20 is provided with a journal portion 37 which is rotatably supported in a suitable anti-friction bearing means 38 which is mounted in the inner end portion of the hub 33 of the ring gear carrier drum or disk 32.

Means is provided for automatically advancing and retracting the rotor member 25 toward and from the cooperative driving face of the impeller member 15. An illustrative form of such means, as shown, comprises a thrust cam ring 39 which is affixed to the internal face of the end wall of the casing shell 12 so as to revolve therewith; said thrust cam ring being disposed concentric to the turbine shaft 20. Said thrust cam ring is provided with suitably shaped cam elements 40 which project rearwardly therefrom. Interposed between said thrust cam ring 39 and the outer face of the rotor member 25 is a shift cam ring 41, the same having suitably shaped cam elements 42 to cooperate with the cam elements 40 of said thrust cam ring 39. Said shift cam ring 41 is rotatably shiftable relative to the thrust cam ring 39 and the rotor member 25, whereby, through the co-action of the cam elements 40 and 42, to effect desired axial movement of the rotor member 25 toward the impeller member 15. Said rotor member 25 is provided with anti-friction thrust bearing means 43 upon which said shift cam ring bears. The means for actuating the shift cam ring 41 comprises the provision in the external periphery of said shift cam ring of indented notches 44. Pivotally mounted on fulcrum studs 45, which are affixed to and project from the inner side of the end wall of the casing shell 12, are the journal hubs 46 of shift dogs 47, the free ends of which are entered in said notches 44. Extending from said journal hubs 46 are lever arms 48 provided at their extremities with weighty portions 49; said weighty portions being subject to the influence of centrifugal force generated by revolution of the turbine casing, are adapted to swing outward the lever arms 48, and thereby rotate the shift dogs 47 to in turn rotatably move the shift cam ring 41 relative to the thrust cam ring 39. Spring means 50 is operative upon the shift cam ring 41, whereby to normally urge the same to normal initial closed relation to the thrust cam ring 39. Stop elements 51, affixed to and projecting from the inner side of the end wall of the casing shell 12, are disposed in the path of outward swinging movement of said lever arms 48, whereby to limit such movement, and thereby to likewise limit the inward axially thrusting movement of the shift cam ring 41 as transmitted to the rotor member 25.

The fixed spacing of the rotor member 28 relative to the driving face of the impeller member 15 cooperative therewith is predetermined to permit of a certain amount of slippage of the former relative to the latter. The rotor member 28 may be spaced so that driving torque is not transmitted thereto, when the driven shaft 11 is under load, until the power shaft 10, and consequently the impeller member 15, attains a speed of predetermined R. P. M., for example, 400 R. P. M.

The axially movable rotor member 25, in normal initial retracted position, is so spaced relative to the driving face of the impeller member 15 cooperative therewith whereby to permit a maximum slippage before driving torque is transmitted by the latter to the former, so that no driving torque is transmitted until the power shaft 10, and consequently the impeller member 15, attains a desired R. P. M., for example, 800 R. P. M., to which speed the centrifugally controlled shift means is responsive, and, upon attainment of which speed, is operated to shift the rotor member 25 into closed relation to the impeller member 15 so that substantially full driving torque is transmitted to the former by the latter.

The described normal relations of the rotor members to the impeller member is calculated to reduce drag upon the power shaft 10 under idling condition of its power source, as e. g., under idling speed of an internal combustion engine serving as such power source. Furthermore, the described normal relations of the rotor members to the impeller member is such that a desired predetermined amount of engine speed acceleration beyond idling speed is permitted before subjection of the engine driven power shaft to full load. When, however, the desired degree of engine and power shaft speed has been attained, the rotor member 25 is quickly advanced and closed upon the impeller member 15 to receive full torque transmission effect therefrom, whereby to thereupon initiate drive of the turbine shaft 20 and sun gear 30 for transmission of power through the planetary gear train to the driven shaft 11 and its load, with low gear driving effect according to the selected ratio of sun gear to ring gear provided by the planetary gear train. Thereafter, as the rotor member 28 is gradually relieved of load drag, it will accumulate speed under the transmitted torque of the impeller member 15, until finally both rotor members 25 and 28 are moving in unison, and operate to transmit power to the driven shaft and its load substantially at power shaft speed, i. e., with high gear driving effect, substantially at a one to one driving ratio.

Assuming that engine idling speed rotates the power shaft 10 and impeller member 15 at or under 400 R. P. M., no driving torque is exerted upon the rotor member 28. If engine and power shaft speed is accelerated beyond 400 R. P. M., some driving torque is applied to the rotor member 28 so that it begins to revolve clockwise. Since the driven shaft 11 is under load, it and the ring gear which is unitary therewith tend to remain stationary, and since under idling conditions no driving torque is exerted by the impeller member 15 upon the retracted rotor member 25, the turbine shaft 20 and sun gear 30 stand idle. Under these conditions, the planetary pinions 35—36, as carried around by the revolving rotor member 28, roll on the stationary ring gear 31, and thereby effect, temporarily, a slow counter-clockwise motion of the sun gear, turbine shaft 20 and rotor member 25, until such time as the accelerating engine, power shaft and impeller member attains a predetermined R. P. M. Owing to the fixed spacing of the rotor member 28 relative to the cooperating driving face of the impeller member 15, and the consequent slippage of the one relative to the other, notwithstanding some rotative movement is transmitted to said rotor member 28, it tends to lag behind the accelerating impeller member. Under these conditions however the power shaft 10 and impeller member 15 continue to accelerate under rising engine speed until they finally attain the speed to which the centrifugally controlled shift means for the rotor member 25 responds; illustratively assumed, as above stated, to be 800 R. P. M. Upon attaining this speed the weighted lever arms 48, in response to centrifugal force, swing outward, thus turning the shift dogs 47 to rotatively advance the shift cam ring 41 relative to the relatively stationary thrust cam ring 39, whereby to effect a forward thrusting pressure upon the rotor member 25, thus advancing the latter on the spirally splined portion 24 so as to close the same against the cooperative driving face of the impeller member 15. When the rotor member 25 thus closes upon the impeller member 15, slippage therebetween is reduced to a minimum, so that full driving torque is transmitted to the rotor member 25 to revolve the same in driving or clockwise direction. Being keyed to the turbine shaft 20 by the splined portion 24, the revolved rotor member 25 drives the sun gear 30 in clockwise direction, thus transmitting power through the dual planetary pinions 35—36 to the ring gear 31, whereby to drive the latter and the driven shaft 11 with low gear effect which is gradually translated to high gear effect in the manner above stated.

After high gear or direct drive is attained, should engine speed be retarded with accompanying drop of power shaft and impeller member speed to less than 800 R. P. M., the lever arms 48 will immediately swing back to normal collapsed positions so that the spring means 50 may rotatively move the shift cam ring 41 back to its normal retracted position and initial relation to the thrust cam ring 39. The momentum of load on the driven shaft 11 and ring gear 31 tends to maintain high speed thereof and of the turbine shaft 20, so that the faster rotation of the splined portion 24 of the latter relative to the diminishing speed of the rotor member 25 under diminishing thrust of the slowing impeller member 15 tends to hold said rotor member 25 in closed relation to said impeller member 15. Under these circumstances, the drag of the impeller member 15 on both rotors 25 and 28 tends to induce a braking effect upon the driven shaft 11, whereby the speed of the latter and of the turbine shaft 20 is caused to gradually diminish. If the speed of the turbine shaft 20 is permitted to drop below that of the rotor member 25, then the latter turns on and relative to the splined portion 24 so as to be thereby caused to shift back to normal initial open position, to so remain until engine speed and accompanying power shaft and impeller member speed is again accelerated.

An incidental advantage of the structure is that the turbine casing, as fixed to the power shaft 10, may serve as an engine fly-wheel.

From the above it will be understood that a very flexible, smoothly operating and self-acting hydro-mechanical variable speed transmission is provided, which is adapted to reduce drag upon the power shaft under idling conditions, as well as to permit power shaft acceleration substantially free of load under starting or pick up conditions and until a desired predetermined R. P. M. thereof is attained before subjection thereof to full load.

I am aware that changes could be made in the construction and arrangement of the mechanisms and their parts without departing from the scope of this invention as defined in the herefollowing claims. It is therefore intended that all matter contained in the foregoing description or shown in the accompanying drawings shall be interpreted as illustrative and not in a limiting sense.

I claim:

1. A hydro-mechanical automatic variable speed transmission comprising a power shaft, a driven shaft, a turbine casing unitary with said power shaft, an annular impeller member within and unitary with said casing, said impeller member having oppositely directed driving faces, a pair of independent rotor members respectively cooperative with the respective driving faces of said impeller member, a dual planetary gear train, one said rotor member carrying the dual planetary pinions of said gear train, the other said rotor member being connected in driving relation to the sun gear of said gear train, and the ring gear of said gear train being connected in driving relation to said driven shaft.

2. A hydro-mechanical automatic variable speed transmission comprising a power shaft, a driven shaft, a turbine casing unitary with said power shaft, an annular impeller member within and unitary with said casing, said impeller member having oppositely directed driving faces, a pair of independent rotor members respectively cooperative with the respective driving faces of said impeller member, a dual planetary gear train, one said rotor member carrying the dual planetary pinions of said gear train, the other said rotor member being connected in driving relation to the sun gear of said gear train, and the ring gear of said gear train being connected in driving relation to said driven shaft, said first mentioned rotor member being disposed in a fixed predetermined slip allowance spaced relation to the cooperating driving face of said impeller member, said second mentioned rotor member being arranged for variable slip allowance spaced relation to the cooperating face of said impeller member, and means operative at a predetermined power shaft speed for moving said last mentioned rotor member from maximum spaced open to closed relation to said cooperating face of the impeller member.

3. A hydro-mechanical automatic variable speed transmission comprising a power shaft, a driven shaft, a turbine casing unitary with said power shaft, an annular impeller member within and unitary with said casing, said impeller member having oppositely directed driving faces, a rotatable axial turbine shaft within said casing, a pair of independent rotor members respectively cooperative with the respective driving faces of said impeller member, a dual planetary gear train, one said rotor member carrying the dual planetary pinions of said gear train, the sun gear of said gear train being affixed to said turbine shaft, the ring gear of said gear train being connected in driving relation to said driven shaft, and the other said rotor member being connected in driving relation to said turbine shaft.

4. A hydro-mechanical automatic variable speed transmission comprising a power shaft, a driven shaft, a turbine casing unitary with said power shaft, an annular impeller member within and unitary with said casing, said impeller member having oppositely directed driving faces, a rotatable axial turbine shaft within said casing, a pair of independent rotor members respectively cooperative with the respective driving faces of said impeller member, a dual planetary gear train, one said rotor member carrying the dual planetary pinions of said gear train, the sun gear of said gear train being affixed to said turbine shaft, the ring gear of said gear train being connected in driving relation to said driven shaft, and the other said rotor member being connected in driving relation to said turbine shaft, said first mentioned rotor member being disposed in a fixed predetermined slip allowance spaced relation to the cooperating driving face of said impeller member, said second mentioned rotor member being arranged for variable slip allowance spaced relation to the cooperating face of said impeller member, and means operative at a predetermined power shaft speed for moving said last mentioned rotor member from maximum spaced open to closed relation to said cooperating face of the impeller member.

5. A hydro-mechanical automatic variable speed transmission comprising a power shaft, a driven shaft, a turbine casing unitary with said power shaft, an annular impeller member within and unitary with said casing, said impeller member having oppositely directed driving faces, a rotatable axial turbine shaft within said casing, a pair of independent rotor members respectively cooperative with the respective driving faces of said impeller member, a dual planetary gear train, one said rotor member carrying the dual planetary pinions of said gear train, the sun gear of said gear train being affixed to said turbine shaft, the ring gear of said gear train being connected in driving relation to said driven shaft, a spirally splined driving connection between said turbine shaft and the other rotor member whereby the latter may be axially moved to slip gap closed or open relation to the cooperating face of said impeller member, and centrifugally controlled means responsive to a predetermined power shaft speed for automatically moving said last mentioned rotor member from open to closed slip gap relation to said impeller member.

6. A hydro-mechanical automatic variable speed transmission comprising a power shaft, a driven shaft, a turbine casing unitary with said power shaft, an annular impeller member within and unitary with said casing, said impeller member having oppositely directed driving faces, a rotatable axial turbine shaft within said casing, a pair of independent rotor members respectively cooperative with the respective driving faces of said impeller member, a dual planetary gear train, one said rotor member carrying the dual planetary pinions of said gear train, the sun gear of said gear train being affixed to said turbine shaft, the ring gear of said gear train being connected in driving relation to said driven shaft, a spirally splined driving connection between said turbine shaft and the other rotor member, said first mentioned rotor member being disposed in a fixed predetermined slip allowance spaced relation to the cooperating driving face of said impeller member, said second mentioned rotor member being returnably movable on said splined connection with said turbine shaft from a predetermined slip allowance spaced relation to the cooperating face of said impeller member to closed relation thereto, and means operative at a predetermined power shaft speed for so moving said last mentioned rotor member.

7. A hydro-mechanical automatic variable speed transmission comprising a power shaft, a driven shaft, a turbine casing unitary with said power shaft, an annular impeller member within and unitary with said casing, said impeller member having oppositely directed driving faces, a rotatable axial turbine shaft within said casing, a pair of independent rotor members respectively cooperative with the respective driving faces of said impeller member, a dual planetary gear train, one said rotor member carrying the dual planetary pinions of said gear train, the sun gear of said gear train being affixed to said turbine shaft, the ring gear of said gear train being connected in driving relation to said driven shaft, a spirally splined driving connection between said turbine shaft and the other rotor member, said first mentioned rotor member being disposed in a fixed predetermined slip allowance spaced relation to the cooperating driving face of said impeller member, said second mentioned rotor member being returnably movable on said splined connection with said turbine shaft from a predetermined slip allowance spaced relation to the cooperating face of said impeller member to closed relation thereto, and centrifugally controlled means responsive to a predetermined power shaft speed for automatically so moving said last mentioned rotor member.

8. A hydro-mechanical automatic variable speed transmission as defined in claim 5 wherein the centrifugally controlled means for moving the last mentioned rotor member comprises a thrust cam ring unitary with said turbine casing, a shift cam ring intermediate said rotor member and thrust cam ring, pivoted shift dogs for rotatively moving said shift cam ring relative to said thrust cam ring, and weighted lever arms for actuating said shift dogs.

9. A hydro-mechanical automatic variable speed transmission as defined in claim 7 wherein the centrifugally controlled means for moving the last mentioned rotor member comprises a thrust cam ring unitary with said turbine casing, a shift cam ring intermediate said rotor member and thrust cam ring, pivoted shift dogs for rotatively moving said shift cam ring relative to said thrust cam ring, and weighted lever arms for actuating said shift dogs.

HENRY BUTHE.